United States Patent
Gindele et al.

(10) Patent No.: US 6,934,056 B2
(45) Date of Patent: Aug. 23, 2005

(54) NOISE CLEANING AND INTERPOLATING SPARSELY POPULATED COLOR DIGITAL IMAGE USING A VARIABLE NOISE CLEANING KERNEL

(75) Inventors: Edward B. Gindele, Rochester, NY (US); James E. Adams, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 243 days.

(21) Appl. No.: 10/331,503

(22) Filed: Dec. 31, 2002

(65) Prior Publication Data

US 2003/0095717 A1 May 22, 2003

Related U.S. Application Data

(63) Continuation of application No. 10/038,951, filed on Jan. 3, 2002, now Pat. No. 6,625,325, which is a continuation-in-part of application No. 09/212,453, filed on Dec. 16, 1998, now Pat. No. 6,795,586.

(51) Int. Cl.[7] .................................................. H04N 1/40
(52) U.S. Cl. ........................................ 358/1.9; 382/162
(58) Field of Search .......... 358/1.9, 463; 382/260–269, 382/205, 210, 162, 275

(56) References Cited

U.S. PATENT DOCUMENTS

| | | |
|---|---|---|
| 5,189,511 A | 2/1993 | Parulski et al. |
| 5,373,322 A | 12/1994 | Laroche et al. |
| 5,382,976 A | 1/1995 | Hibbard |
| 5,596,367 A | 1/1997 | Hamilton et al. |
| 5,652,621 A | 7/1997 | Adams, Jr. et al. |
| 5,671,264 A | 9/1997 | Florent et al. |
| 5,768,440 A | 6/1998 | Campanelli et al. |
| 5,802,481 A | 9/1998 | Prieto |
| 5,923,775 A | 7/1999 | Snyder et al. |
| 6,042,545 A | 3/2000 | Hossack et al. |
| 6,229,578 B1 | 5/2001 | Acharya et al. |

FOREIGN PATENT DOCUMENTS

JP      98/0014143      1/1998

OTHER PUBLICATIONS

J–S. Lee, "Digital Image Smoothing and the Sigma Filter," *Computer Vision, Graphics, and Image Processing*, 24, 1983, 255–269.
G.A. Mastin, "Adaptive Filters for Digital Image Noise Smoothing: An Evaluation," *Computer Vision, Graphics, and Image Processing*, 31, Jul. 1, 1985, 103–121.
W.K. Pratt, "Noise Cleaning" in *Digital Image Processing, Second Edition*, John Wiley & Sons, Inc., New York, 1991, 285–302.
U.S. Appl. No. 09/145,014, filed Sep. 2, 1998.
U.S. Appl. No. 10/038,951, filed Jan. 3, 2002, Gindele et al.
U.S. Appl. No. 09/212,453, filed Dec. 16, 1998, Gindele et al.

*Primary Examiner*—Thomas D. Lee
*Assistant Examiner*—Stephen Brinich
(74) *Attorney, Agent, or Firm*—Raymond L. Owens

(57) ABSTRACT

A method for processing a sparsely populated color digital image having colored pixels to produce a fully populated and noise clean color image including noise cleaning the sparsely populated image using a variable noise cleaning kernel to provide a noise clean sparsely populated color digital image; and interpolating the noise clean sparsely populated image for producing color pixels with appropriate values missing from the sparsely populated color digital image by interpolating the color values for missing pixels from neighboring color pixels.

4 Claims, 5 Drawing Sheets

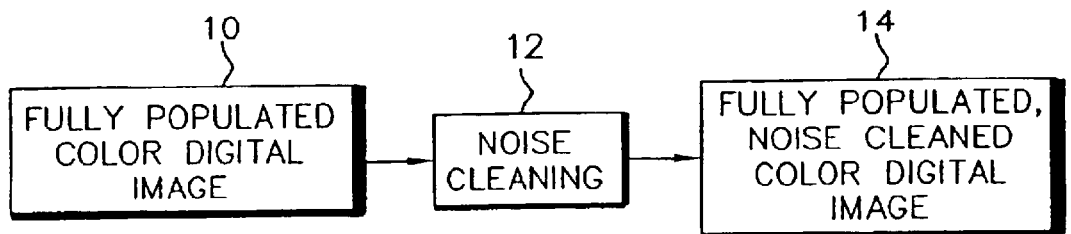
FIG. 1
(Prior Art)
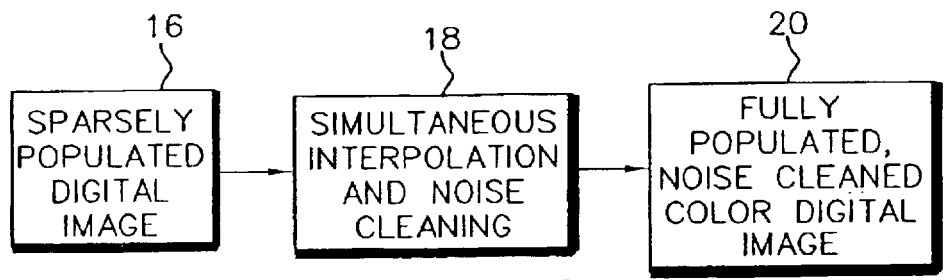
FIG. 2
(Prior Art)
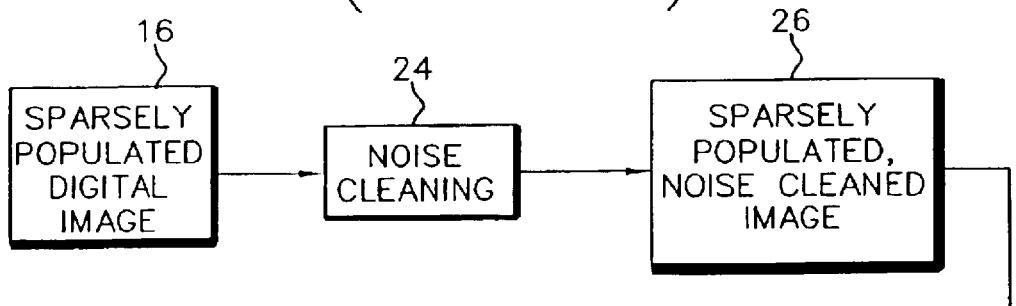
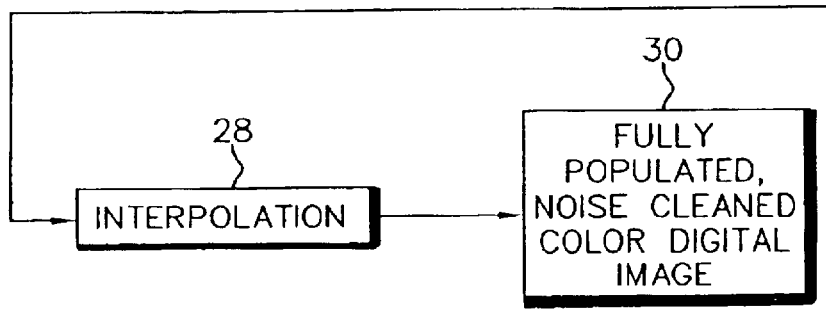
FIG. 3

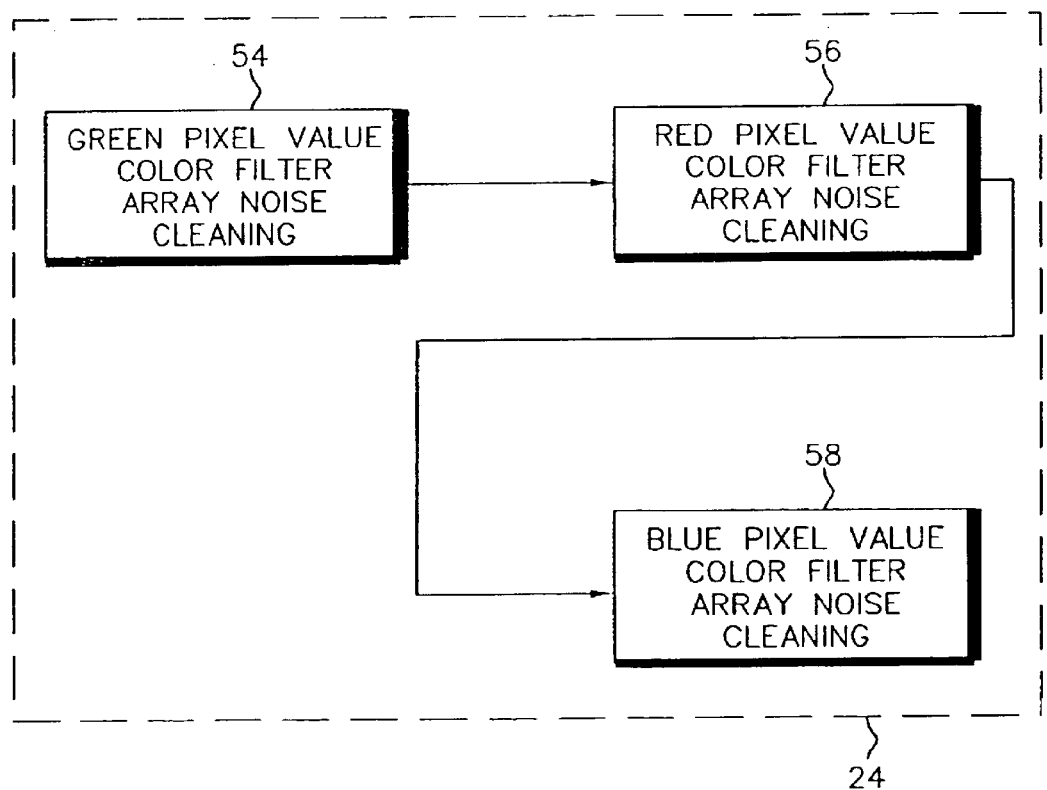

NOISE CLEANING AND INTERPOLATING SPARSELY POPULATED COLOR DIGITAL IMAGE USING A VARIABLE NOISE CLEANING KERNEL

CROSS-REFERENCE TO RELATED APPLICATION(S)

This application is a continuation of U.S. application entitled NOISE CLEANING AND INTERPOLATING SPARSELY POPULATED COLOR DIGITAL IMAGE USING A VARIABLE NOISE CLEANING KERNAL having Ser. No. 10/038,951, by Edward B. Gindele and James E. Adams, filed Jan. 3, 2002 now U.S. Pat. No. 6,625,325 which is a continuation-in-part of U.S. application entitled NOISE CLEANING AND INTERPOLATING SPARSELY POPULATED COLOR DIGITAL IMAGE having Ser. No. 09/212,453, by Edward B. Gindele and James E. Adams, filed Dec. 16, 1998 now U.S. Pat. No. 6,795,586, both of which are incorporated by reference herein.

BACKGROUND OF THE INVENTION

1. Field of the Invention

The present invention relates to noise cleaning and interpolating sparsely populated color digital image and, more particularly, to a system that uses a variable noise cleaning kernel to clean the image before it is fully populated.

2. Description of the Related Art

In electronic photography, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of photo-sites that detect the luminosity of the light falling on the sensors where the sites are covered by a pattern of red, green and blue filters. This type of sensor is known as a color filter array or CFA. Below is shown pattern of the red (R), green (G), and blue (B) pixel filters arranged in rows and columns on a conventional color filter array sensor.

| R | G | R | G | R |
|---|---|---|---|---|
| G | B | G | B | G |
| R | G | R | G | R |
| G | B | G | B | G |
| R | G | R | G | R |

Digital images produced by these and other types of devices, such as linear scanners, which scan photographic images, often produce a sparsely populated color digital image. Such an image has a problem in that it has a noise component due to random variations in the image capturing system, such as thermal variations in the color filter array sensor, or with the associated electronic circuitry or the like. Also, when an image is being interpolated to produce a fully populated color digital image, artifacts can be introduced. It is, of course, highly desirable to remove these noise components.

FIG. 1 depicts a prior art arrangement wherein a fully populated digital color image in block 10 is first noise cleaned in block 12 to provide a fully populated noise cleaned image 14. Examples of arrangements which provide these functions are set forth in: U.S. Pat. No. 5,671,264 to Florent, et al., U.S. Pat. No. 5,768,440 to Campanelli, et al., and U.S. Pat. No. 5,802,481 to Prieto. See also J-S. Lee, "Digital Image Smoothing and the Sigma Filter," Computer Vision, Graphics, and Image Processing, 24, 1983, 255–269; G. A. Mastin, "Adaptive Filters for Digital Image Noise Smoothing: An Evaluation," Computer Vision, Graphics, and Image Processing, 31, 1, July 1985, 103–121; and W. K. Pratt, "Noise Cleaning" in Digital Image Processing, Second Edition, John Wiley & Sons, Inc., New York, 1991, 285–302. This arrangement has problems. In order to begin with a fully populated digital color image, a number of image processing operations have already taken place on the original sparsely populated image data. Each operation that is performed on the sparsely populated image data to create a fully populated digital color image will amplify the noise imbedded in the original sparsely populated image data. Additionally, the ability to separate noise from genuine image information may be compromised by certain image processing operations that rely on and impose certain amounts of spatial correlation between the color planes of an image. Color filter array interpolation is an example of this kind of image processing operation. As a result, the relationship between noise and genuine image data is raised in complexity and, accordingly, more complex noise cleaning algorithms are required. Finally, since the original sparsely populated image data is noisy, the image processing operations that are performed on this data will produce sub-optimal results due to the noise.

FIG. 2 shows another prior art arrangement wherein a sparsely populated color digital image is simultaneously interpolated and noise cleaned in block 18 to provide a fully populated color digital image 20. Examples of arrangements which provide these functions are set forth in: U.S. Pat. No. 5,382,976 to Hibbard, U.S. Pat. No. 5,596,367 to Hamilton, et al., and U.S. Pat. No. 5,652,621 to Adams, et al. This arrangement also has problems. While the noise cleaning is occurring before a fully populated color digital image is produced, a number of image processing operations are still being performed on noisy data. For example, if the CFA interpolation employed is an adaptive algorithm, the decisions the algorithm makes during the course of the interpolation process can be significantly influenced by the noise embedded in the image data. As a result, wrong decisions can be made which produce pixel artifacts and unnecessary amplification of the noise in the image data.

SUMMARY OF THE INVENTION

It is an aspect of the present invention to provide a more effective way of interpolating and noise cleaning sparsely populated color digital image to provide fully populated noise cleaned color digital images.

It is another aspect of the present invention to provide cleaning which varies the cleaning contribution by a pixel of a noise cleaning kernel responsive to the noise associated with each pixel.

It is also an aspect of the present invention is to provide noise cleaning which preserves the original, bona fide spatial detail in the image.

These aspects are achieved by a system for processing a sparsely populated color digital image having colored pixels to produce a fully populated and noise clean color image. The system includes noise cleaning the sparsely populated image to provide a noise clean sparsely populated color digital image responsive to noise of the pixels in the image. The system also includes interpolating the noise clean sparsely populated image producing a fully populated and noise clean color image.

Advantages

The advantages of this invention are 1) avoidance of noise amplification and pixel artifact generation in subsequent image processing operations, 2) the permitting of the use of simpler noise cleaning algorithms which are computationally more efficient, and 3) maximization of performance of subsequent image processing operations due to the reduction of noise in the image data.

BRIEF DESCRIPTION OF THE DRAWINGS

FIG. 1 is a block diagram of a prior art processing arrangement for producing fully populated noise clean color digital images.

FIG. 2 is another block diagram of a prior art processing arrangement for producing fully populated noise clean color digital images.

FIG. 3 is a block diagram of a noise cleaning and interpolation arrangement in accordance with the present invention.

FIGS. 4C–4E show various pixel neighborhoods of a preferred embodiment of the interpolation depicted in FIG. 3.

FIGS. 5A–5C show 5×5 kernels or matrices for respectively noise cleaning red, green, and blue color pixels of the FIG. 3 arrangement.

FIG. 6 is a more detailed block diagram of block 24 of FIG. 3.

DETAILED DESCRIPTION OF THE INVENTION

Figure 4A:
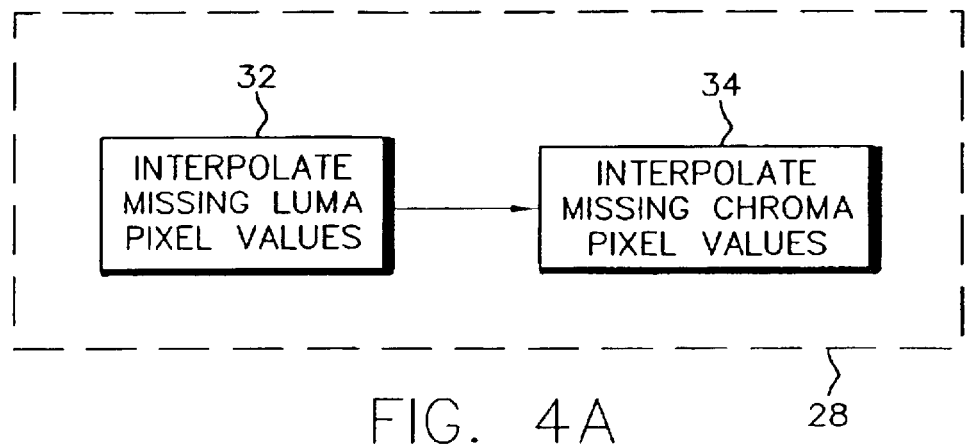
FIGS. 4A–4B are flowcharts of a preferred embodiment of the interpolation depicted in FIG. 3.

Referring to FIG. 3, in accordance with the present invention, the process of producing a noise-cleaned image begins in block 16 with a sparsely populated digital image. This image is missing pixel values at various spatial locations, in various color planes, or both. Noise cleaning is then performed in block 24 on the image that removes, or cleans, the noise from the existing image data. This noise cleaning is designed to operate using only the existing image data. The result is a sparsely populated, noise-cleaned image (block 26). At this point interpolation is performed in block 26 to produce estimates for each of the missing pixel values in the image. The result of the interpolation is a fully populated, noise cleaned color digital image (see block 30.)

FIG. 4C is an example of a sparsely populated digital image. This figure shows a portion of a color filter array commonly used in digital cameras. Each pixel in the camera sensor is covered with either a red, green, or blue filter. As a result, at each pixel location in the image captured by the digital camera only one of three color pixel values is produced. FIG. 6 shows a strategy for noise cleaning this type of image. The main strategy is to clean each color plane in the sparsely populated image separately. In block 24 of FIG. 6, the first color plane cleaned is the green plane. FIG. 5A shows a portion of the color filter array image with a green pixel to be cleaned in the center of a 5×5 kernel. Each green pixel value within that kernel is surrounded with a square. From FIG. 5A it can be seen that a maximum of 13 green pixel values are available within this kernel for producing a noise cleaned value for the central green pixel.

The noise cleaning operation (block 54) must be designed to use, at most for this kernel pattern, only these 13 green pixel values. Once the green pixels values in the color filter array image have been cleaned, then the red pixel values are cleaned (see block 56.) FIG. 5B shows a portion of the color filter array image with a red pixel in the center of a 5×5 kernel. Each red pixel value within that kernel is surrounded with a square. From FIG. 5B is can be seen that a maximum of 9 red pixel values are available within this kernel for producing a noise cleaned value for the central red pixel. In block 56, the noise cleaning operation must be designed to use, at most for this kernel pattern, only these 9 red pixel values. Finally, in block 58, the blue pixel values are cleaned. FIG. 5C shows a portion of the color filter array image with a blue pixel in the center of a 5×5 kernel. Each blue pixel value within that kernel is surrounded with a square. From FIG. 5C is can be seen that a maximum of 9 blue pixel values are available within this kernel for producing a noise cleaned value for the central blue pixel. The noise cleaning operation of block 58 must be designed to use, at most for this kernel pattern, only these 9 blue pixel values.

Other kernel patterns are possible where the pixel to be cleaned does not reside in the center of the kernel. For example, it is possible for the pixel being cleaned to be located on one side of the kernel, such that the pattern of kernel pixels associated with the pixel being cleaned is asymmetrical. Additionally, the size of the kernel may be increased to use information over a large portion of the image during the cleaning process. For example, it is possible to select kernel size and/or shape based on the ISO setting that exists during image capture.

Figure 7:
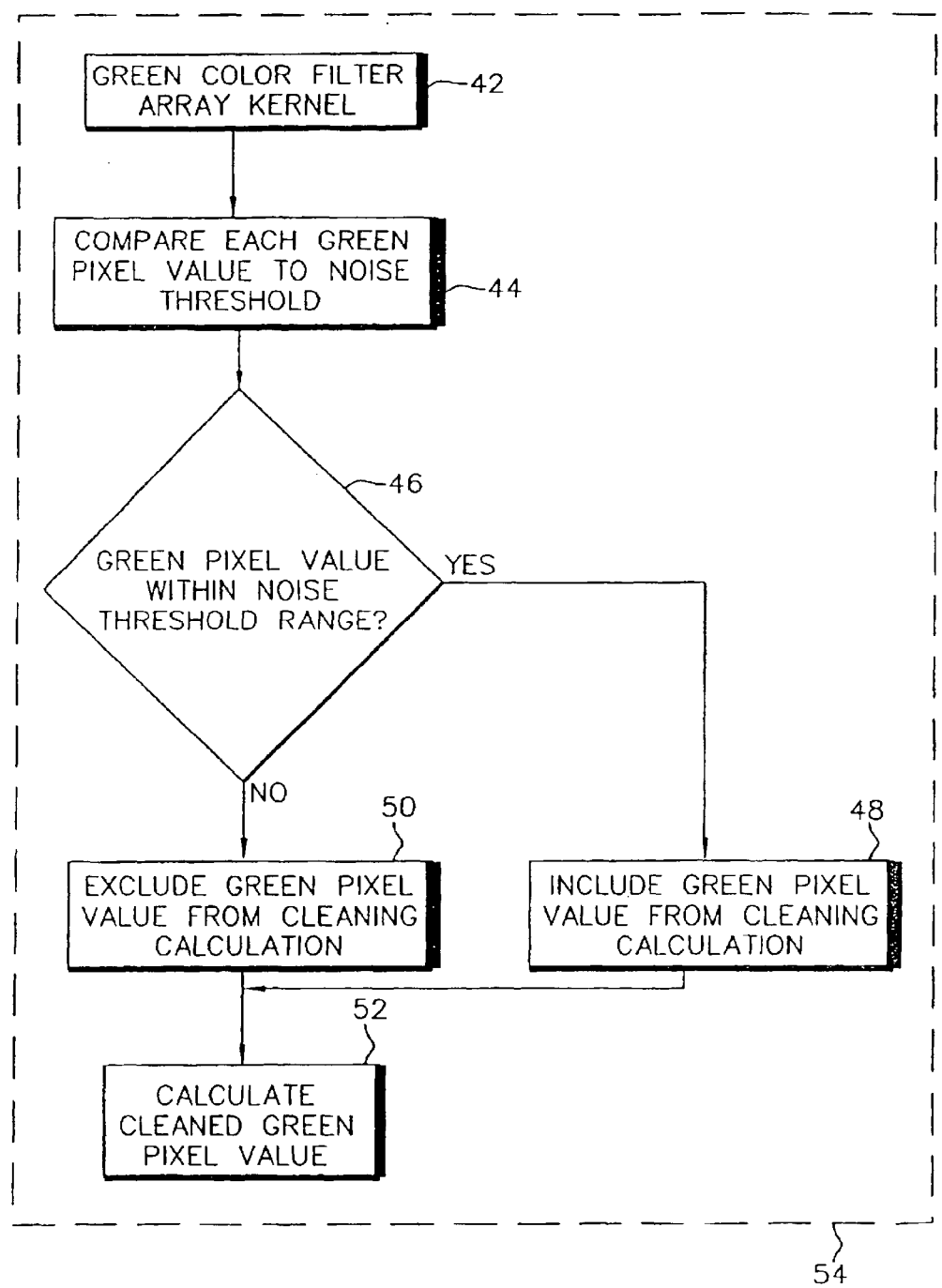
FIG. 7 is a flow chart of block 24 shown in FIG. 6.

FIG. 7 describes how noise cleaning can be performed on the color filter array sampled green pixel values of block 54. This approach could be called cleaning using a variably weighted noise cleaning kernel. In block 42, the noise cleaning begins by selecting a green color filter array kernel to be cleaned. This kernel has already been illustrated in FIG. 5A. Each green pixel value within FIG. 5A is compared with a predetermined noise threshold value in block 44. This noise threshold value characterizes the typical amount of noise the image capture device is expected to produce. Commonly, it is assumed that the noise in an image is Gaussian distributed. Using this assumption, one evaluates the standard deviation of the noise for a number of typical mean pixel values and sets the noise threshold value equal to 2 times the standard deviation. Returning to block 44, in the comparison of the green pixel value with the noise threshold value (block 44), the absolute difference between each green pixel value in the kernel and the green pixel value in the center of the kernel is compared with the noise threshold value. If, in block 46, this green pixel value difference is less than or equal to the noise threshold value, then the green pixel value is included in the subsequent noise cleaning calculation shown in block 48. If the green pixel value difference exceeds the noise threshold, then the green pixel value is not used in the subsequent noise cleaning calculation in block 50. Once each green pixel value in the kernel is tested, then a noise cleaned value for the central green pixel value is calculated in block 52. This calculation in this embodiment is a simple average of all of the green pixel values that satisfied the noise threshold value comparison accomplished in block 48.

It should be noted that the noise cleaned value needs to be stored separately from the raw image data until the entire color plane has been noise cleaned. All noise cleaning operations in FIG. 6 are performed on image data that has not been previously noise cleaned. Noise cleaning of the red pixel values in block 56 and the blue pixel values in block 58 are performed in the same manner as noise cleaning of the green pixel values in block 54. The only changes would be different values for the noise thresholds and different locations of the pixel values processed (see FIGS. 5B and 5C).

Figure 4B:
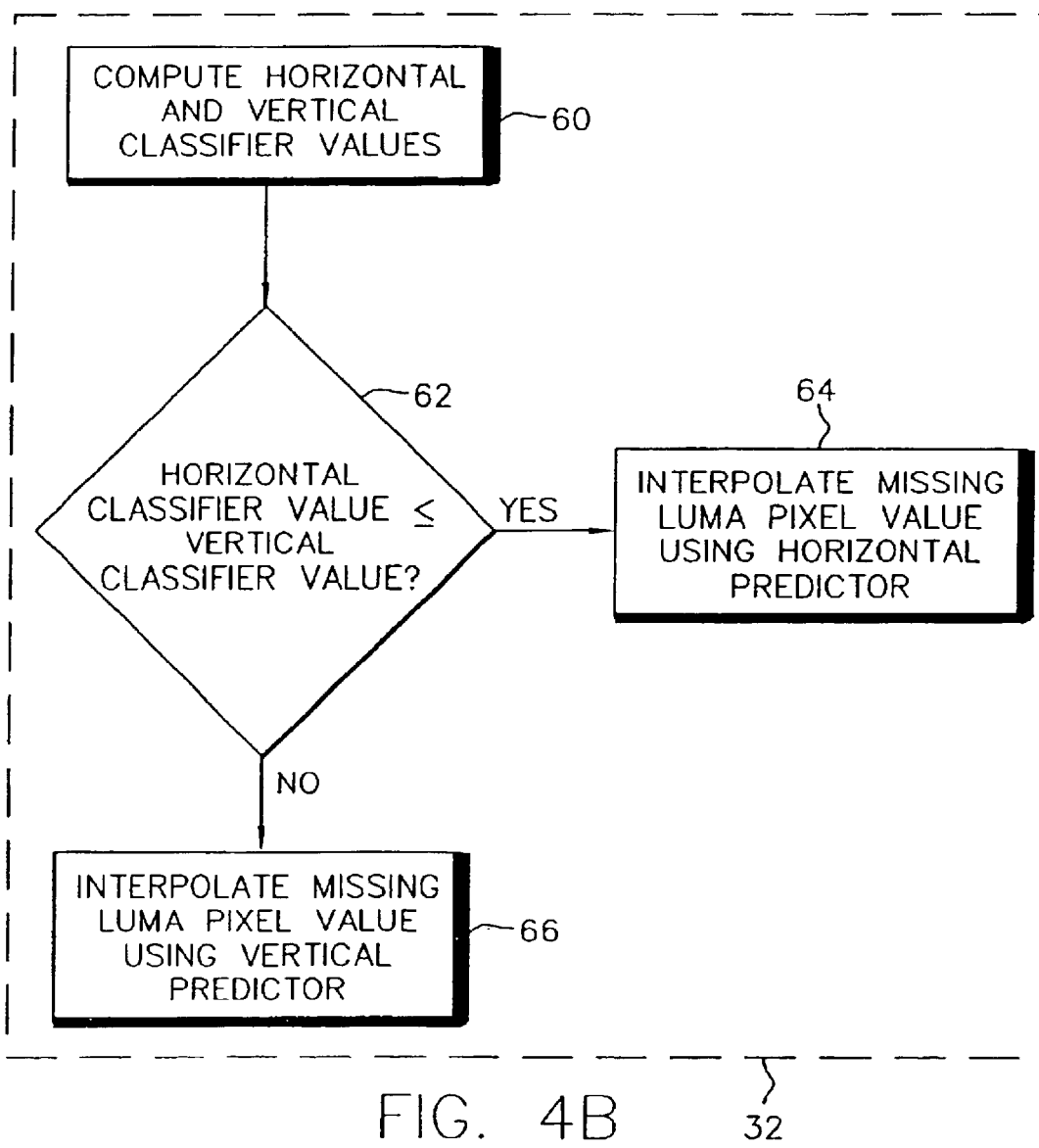

Once or after the color filter array data has been noise cleaned producing the sparsely populated noise cleaned image in block 26, the image data is interpolated (28—see FIG. 3) to produce a fully populated nose cleaned color digital image in block 30. FIG. 4A shows that interpolation is preferably performed in two stages. The first stage interpolates missing green, or luma, pixel values in block 32, and the second stage interpolates missing red and blue, or chroma, pixel values in block 34. FIG. 4B is a more detailed diagram of the preferred luma interpolation process. Luma interpolation begins by selecting an appropriate pixel neighborhood around the missing luma pixel value in question. In FIG. 4D, the missing luma value G5 is being determined. The first operation is to calculate horizontal and vertical classifier values for the neighborhood in block 60. The horizontal classifier value, h, for FIG. 4D can be:

$$h = ABS(G4-G6) + ABS(2R5-R3-R7)$$

where ABS (X) is the absolute value of X. The vertical classifier value, v, for FIG. 4D can be:

$$v = ABS(G2-G8) + ABS(2R5-R1-R9).$$

These classifier values are then compared to each other in block 62. If the horizontal classifier value is less than or equal to the vertical classifier value, then the missing luma pixel value is set equal to the horizontal predictor value, H, for the neighborhood (see block 64). The horizontal predictor value for FIG. 4D can be:

$$H = (G4+G6)/2 + K(2R5-R3-R7)$$

where K is an adjustable value that controls the fidelity of the reconstructed luma color plane. Typical values for K are ¼, 3/16 and ⅛. If the horizontal classifier value is greater than the vertical classifier value, then the missing luma pixel value is set equal to the vertical predictor value, V, for the neighborhood (see block 66). The vertical predictor value for FIG. 4D can be $$V = (G2+G8)/2 + K(2R5-R1-R9)$$

where the same value of K would be used for both the horizontal predictor value and the vertical predictor value.

The second stage of the interpolation process provided in block 34 is chroma interpolation. Chroma interpolation refers to both red and blue pixel value interpolation. Either color plane may be interpolated first. FIG. 4E shows an appropriate pixel neighborhood for performing red interpolation. It is assumed that luma interpolation has been completed, so the green pixel values G1, G3, G5, G7 and G9 are available. The red pixel values R2 and R8 are calculated using the following horizontal predictors:

$$R2 = (R1+R3)/2 + (2G2-G1-G3)/2 \text{ and}$$

$$R8 = (R7+R9)/2 + (2G8-G7-G9)/2.$$

The red pixel values R4 and R6 are calculated using the following vertical predictors:

$$R4(R1+R7)/2 + (2G4-G1-G7)/2 \text{ and}$$

$$R6(R3+R9)/2 + (2G6-G3-G9)/2.$$

The red pixel value R5 is calculated using the following four-corner predictor:

$$R5 = (R1+R3+R7+R9)/4 + (4G5-G1-G3-G7-G9)/4.$$

All missing red pixel values in the image can be calculated in this manner. Missing blue pixel values may also be calculated from these predictors. The only changes required to FIG. 4E and the preceding predictors is to exchange every occurrence of "R" with "B."

As discussed above, the cleaning can use a noise threshold that is fixed relative to a common assumption. It is also possible to set the noise threshold in a number of other different ways. As will be discussed below, the noise threshold can be a function of pixel value, which can also be determined in a number of different ways.

Stochastic noise in most imaging applications is a function of signal strength and color. For digital imaging applications this means that the magnitude of noise present in the sparsely populated digital image is a function of the pixel values. Furthermore, the noise magnitude can be different for the red, green, and blue pixels. For improved results, the present invention uses a table of noise threshold values $T_r$, $T_g$, and $T_b$, one table of noise threshold values for the red, green, and blue pixels respectively to provide a different variably weighted noise cleaning kernel. Thus, for each processed color pixel value the corresponding table of noise threshold values is used. Each table of noise threshold values has an entry for each possible pixel value. For example, if the sparsely populated digital image is characterized as a 10-bit image the table of noise threshold values would have 1024 entries for each color. For each green pixel to be cleaned, the noise threshold value is selected from the green table of noise threshold values. For example, if the value of the green pixel to be cleaned is denoted as $p_g$, the noise threshold value used is given by $T_g[p_g]$. This aspect of the present invention provides better noise cleaning results due to the fact that the noise threshold is more nearly matched to the noise present in the sparsely populated digital image. The resulting processed digital images have noise removed without losing valuable image signal modulation. For some color filter array images the noise magnitude can vary by as much as a factor of 8 for different pixel values of the same color.

The tables of noise threshold values are determined based on the expected noise in the digital images to be processed. The expected noise is determined using test images that include spatially flat regions. A poster board including uniform areas of different densities can be photographed in an exposures series with a prototype digital camera to produce the test images. A flat region could also be a stiff sheet of cardboard that has been carefully painted with scientific grade flat paint and then evenly illuminated in the laboratory with a high-precision illumination system. The camera would be set up so that this evenly illuminated flat test chart would fill the entire field of view of the image. The noise present in these spatially flat regions is measured for the noise magnitude. The table of noise threshold values $T_r$, $T_g$, and $T_b$, is generated by multiplying the measured noise magnitudes for each color and pixel value by a factor of two. However, factors ranging from 0.7 to 3.0 have also been shown to yield good results. The optimum factor, in general, depends on the digital imaging application. For a given photographic image, the actual value used is based on the ISO setting of the camera at the time the image was captured.

The tables of noise threshold values for the noise in the digital images to be processed can also be estimated from the sparsely populated digital images directly. The present invention uses a modified version of the method described by Snyder et al. in U.S. Pat. No. 5,923,775 to estimate the noise present in the sparsely populated digital image. The method described by Snyder et al. is designed to work well for individual digital images and includes a multiple step process for the noise characteristics estimation procedure. A first residual signal is formed from the digital image obtained by applying an edge detecting spatial filter to the sparsely populated digital image. This first residual is analyzed to form a mask signal that determines what regions of the sparsely populated digital image are more and less likely to contain image structure content. The last operation includes forming a second residual signal with a Laplacian spatial filter and sampling the residual in regions unlikely to contain image structure content to form a noise standard deviation estimation. The procedure is calculated on each color of pixels individually. Additionally, the noise standard deviation estimations are tabulated as a function of the pixel values. The final operation of the noise estimation processing is the calculation of a table of noise threshold values. As described above, the noise threshold values are calculated as two times the noise standard deviation estimations for best results.

The present invention can be practiced with other noise filters than the sigma filter described above. In an alternative embodiment a median filter is applied to the kernel pixels. While the sigma filter logic selectively averages pixel values, the median filter is based on statistical selection where median filtering extracts the median or central value from an ordered distribution of pixel values and uses said central value as the cleaned value. As in the preferred embodiment, the median filter is applied only to pixels of the same color as the color of the pixel to be cleaned. The median filter selects the statistical median of the distribution of kernel pixel values as the noise cleaned pixel value, i.e. the noise cleaned value for the desired, typically, central green pixel value.

Figure 8:
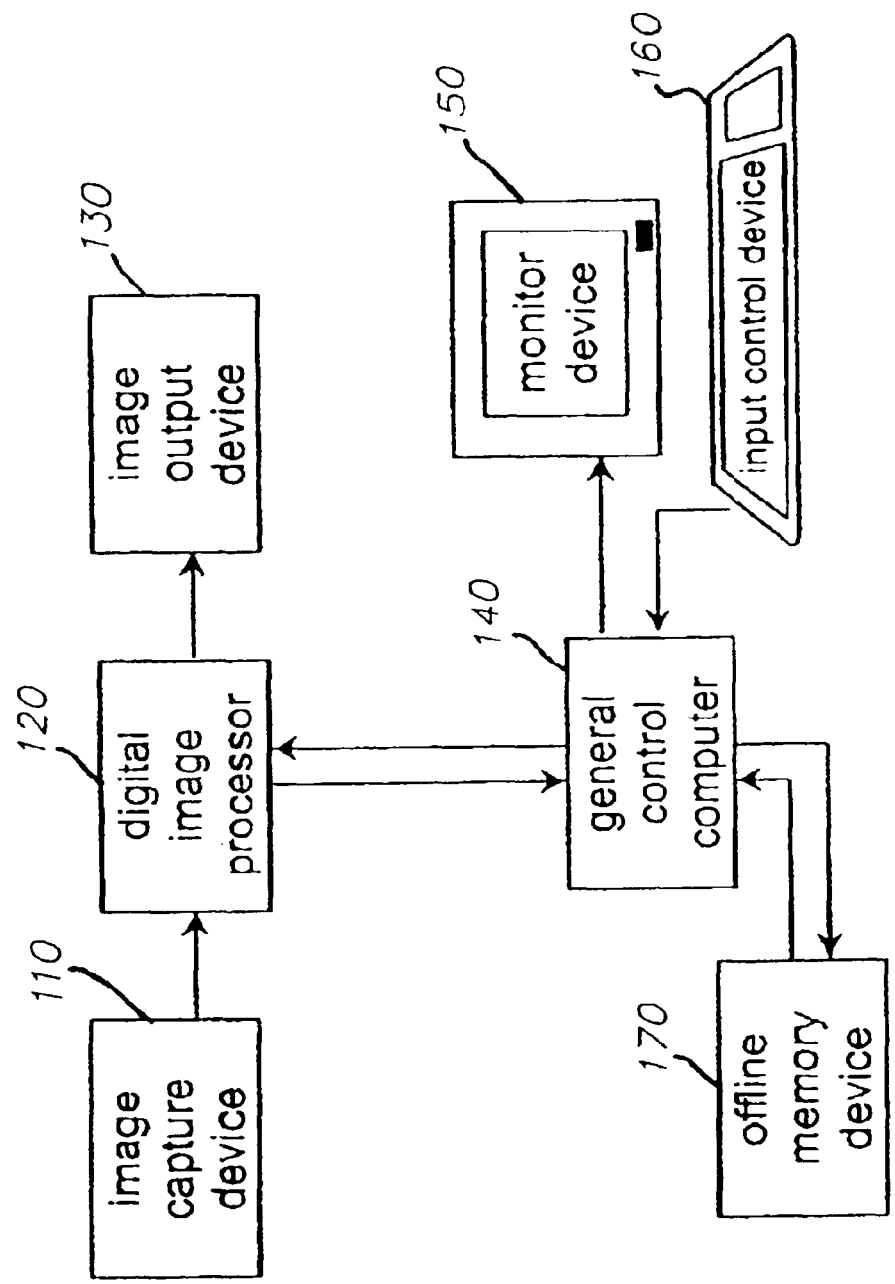
FIG. 8 is a block diagram of hardware components of the present invention.

The present invention may be implemented in computer hardware. Referring to FIG. 8, the following description relates to a digital imaging system which includes an image capture device 110, an digital image processor 120, an image output device 130, and a general control/purpose computer 140. The digital image processor 120 typically performs the operations discussed herein although the general control computer 140 could perform the operations. The system may include a monitor device 150, such as a computer console or paper printer. The system may also include an input device control for an operator such as a keyboard and or mouse pointer 160. For example, FIG. 8 may represent a digital photo-finishing system where the image capture device 110 is a conventional photographic film camera for capturing a scene on color negative or reversal film, and a film scanner device for scanning the developed image on the film and producing a digital image. The image capture device 110 can also be a digital camera. The digital image processor 120 provides the means for processing the digital images to produce pleasing looking images on the intended output device or media. The present invention can be used in conjunction with a variety of output devices that can include a digital photographic printer and soft copy display. The digital image processor processes the digital image to adjust the overall brightness, tone scale, image structure etc. of the digital image in a manner such that a pleasing looking image is produced by an image output device 130.

The general control computer 140 shown in FIG. 2 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 170.

It should also be noted that the present invention implemented in a combination of software and/or hardware is not limited to devices that are physically connected and/or located within the same physical location. One or more of the devices illustrated in FIG. 8 may be located remotely and may be connected via a wireless connection.

For digital camera applications the present can be practiced with a digital image processor 120 located within the digital camera. For this case the digital images produced by the digital camera have noise removed and are fully populated, noise cleaned color digital images. Consequently, the digital image processor 120 shown in FIG. 8 as part of the digital photo-finishing apparatus does not apply the noise cleaning and interpolation steps since these steps were performed in the digital camera.

The invention has been described in detail with particular reference to certain preferred embodiments thereof, but it will be understood that variations and modifications can be effected within the spirit and scope of the invention.

PARTS LIST

| | |
|---|---|
| 10 | fully populated color digital image |
| 12 | noise cleaning block |
| 14 | fully populated, noise cleaned color digital image |
| 16 | sparsely populated digital image |
| 18 | simultaneous interpolation and noise cleaning block |
| 20 | fully populated, noise cleaned color digital image |
| 24 | noise cleaning block |
| 26 | sparsely populated, noise cleaned image |
| 28 | interpolation block |
| 30 | fully populated, noise cleaned color digital image |
| 32 | luma interpolation block |
| 34 | chroma interpolation block |
| 42 | green color filter array kernel |
| 44 | noise threshold comparison block |
| 46 | green pixel value comparison block |
| 48 | green pixel value inclusion block |
| 50 | green pixel value exclusion block |
| 52 | cleaned green pixel value calculation block |
| 54 | green pixel value noise cleaning block |
| 56 | red pixel value noise cleaning block |
| 58 | blue pixel value noise cleaning block |
| 60 | classifier value computation block |
| 62 | classifier value comparison block |
| 64 | luma horizontal prediction block |
| 66 | luma vertical prediction block |
| 110 | image capture device |
| 120 | digital image processor |
| 130 | image output device |
| 140 | general control computer |
| 150 | monitor device |
| 160 | input control device |
| 170 | offline memory |

What is claimed is:

1. A method for processing a sparsely populated color digital image provided by a color filter array of a scanner or digital camera having colored pixels to produce a fully populated and noise clean color image, comprising:

noise cleaning the colored pixels in the sparsely populated color digital image by providing a noise cleaning kernel for each color in the sparsely populated image and calculating noise cleaned pixel values by averaging selected kernel pixel values based on the kernel pixel values and the pixel value of a pixel to be cleaned of the kernel respectively wherein such averaging of selected kernel pixel values is in accordance with noise thresholds that are estimated from colored pixels in the sparsely populated digital image; and interpolating the noise clean sparsely populated image for producing color pixels with appropriate values missing from the sparsely populated color digital image by interpolating the color values for missing pixels from neighboring color pixels.

2. A method as recited in claim 1, wherein the pixel to be cleaned is the center pixel of the kernel.

3. A method for processing a sparsely populated color digital image having colored pixels to produce a fully populated and noise cleaned color image, comprising:

providing a noise cleaning kernel for each color of pixels;

selecting a pixel of interest;

producing a noise cleaned pixel value for the pixel of interest by a weighted average of kernel pixel values wherein the weighting factor for each kernel pixel value is based the expected magnitude of noise in sparsely populated color digital image and the difference between the value of the pixel of interest and kernel pixel value;

repeating the selecting and the producing for all other pixels in the sparsely populated color digital image using the same weighted averaging process to produce a noise cleaned sparsely populated color digital image; and interpolating the noise clean sparsely populated color digital image for producing color pixels with appropriate values missing from the sparsely populated color digital image by interpolating the color values for missing pixels from neighboring color pixels.

4. A method for processing a sparsely populated color digital image having colored pixels to produce a fully populated and noise cleaned color image, comprising:

providing a noise clean kernel for each color of pixels;

selecting a pixel of interest;

producing a noise cleaned pixel value for the pixel of interest by a weighted average of kernel pixel values wherein the weighting factor for each kernel pixel value is based on the difference between the value of the pixel of interest and kernel pixel value;

repeating the selecting and the producing for all other pixels in the sparsely populated color digital image to produce a noise cleaned sparsely populated color digital image; and interpolating the noise clean sparsely populated color digital image for producing color pixels with appropriate values missing from the sparsely populated color digital image by interpolating the color values for missing pixels from neighboring color pixels.

* * * * *